(12) United States Patent
Chamarajnager et al.

(10) Patent No.: US 11,005,719 B2
(45) Date of Patent: *May 11, 2021

(54) INTERNET OF THINGS SYSTEM TOPOLOGY GENERATION

(71) Applicant: VMware, Inc., Palo Alto, CA (US)

(72) Inventors: Ravishankar Chamarajnager, Atlanta, GA (US); Devanand Kondur, Alpharetta, GA (US); Vasudev Yendapally, Alpharetta, GA (US); Niranjan Maka, Union City (CA)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,953

(22) Filed: Dec. 11, 2018

(65) Prior Publication Data

US 2020/0186431 A1 Jun. 11, 2020

(51) Int. Cl.
*H04L 12/24* (2006.01)
*H04L 12/66* (2006.01)
*H04L 29/08* (2006.01)
*H04W 4/70* (2018.01)

(52) U.S. Cl.
CPC .............. *H04L 41/12* (2013.01); *H04L 12/66* (2013.01); *H04L 41/22* (2013.01); *H04L 41/5041* (2013.01); *H04L 67/12* (2013.01); *H04W 4/70* (2018.02)

(58) Field of Classification Search
CPC ..... H04L 12/12; H04L 12/66; H04L 12/2803; H04L 29/0621; H04L 29/06068; H04L 29/06224; H04L 41/00; H04L 41/12; H04L 41/22; H04L 41/5041; H04L 45/02; H04L 65/102; H04L 67/025; H04L 67/12; H04L 67/125; H04W 4/70; H04W 24/00; H04W 24/04; H04W 84/00; H04M 7/1205; G05B 19/4185; A63F 13/30

See application file for complete search history.

(56) References Cited

U.S. PATENT DOCUMENTS

| | | | |
|---|---|---|---|
| 9,712,486 B2 * | 7/2017 | Johnson | H04L 41/0803 |
| 10,002,526 B1 * | 6/2018 | Dyer | G08C 17/02 |
| 10,064,062 B2 | 8/2018 | Idnani et al. | |
| 10,079,691 B2 * | 9/2018 | Christopher | H04W 4/70 |
| 10,095,495 B2 * | 10/2018 | Leonelli | G06F 8/61 |
| 10,104,077 B1 | 10/2018 | Irwan et al. | |
| 10,255,067 B2 * | 4/2019 | Noens | G06F 8/77 |

(Continued)

FOREIGN PATENT DOCUMENTS

WO 2018190854 10/2018

*Primary Examiner* — Tri H Phan
(74) *Attorney, Agent, or Firm* — Thomas | Horstemeyer LLP (57) ABSTRACT

Disclosed are various examples for generating an Internet-of-Things (IoT) system topology. A user interface includes a graphical representation of components. A relationship between the plurality of components is determined based on user-defined connections between the components. IoT topology code is generated. The IoT topology code includes the relationship between the plurality of components and properties for individual ones of the components. The IoT topology code is converted to executable gateway instructions that enable a gateway device to communicate with an IoT device. The gateway instructions are transmitted to the gateway device.

17 Claims, 6 Drawing Sheets

(56) References Cited

U.S. PATENT DOCUMENTS

| | | | |
|---|---|---|---|
| 10,481,925 B2* | 11/2019 | Yang | H04L 41/22 |
| 10,547,731 B2* | 1/2020 | Kim | H04W 12/06 |
| 10,693,795 B2* | 6/2020 | Chen | H04L 47/805 |
| 2016/0274870 A1* | 9/2016 | Seidman | G06F 8/35 |
| 2017/0019853 A1 | 1/2017 | Ghosh et al. | |
| 2017/0180462 A1* | 6/2017 | Leonelli | G06F 8/35 |
| 2018/0054850 A1* | 2/2018 | Leonelli | H04L 67/10 |
| 2018/0213349 A1* | 7/2018 | Panje | H04L 12/281 |
| 2019/0230063 A1* | 7/2019 | McCready | H04W 12/0609 |
| 2019/0356556 A1* | 11/2019 | Vicat-Blanc | G06F 30/20 |

* cited by examiner

INTERNET OF THINGS SYSTEM TOPOLOGY GENERATION

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access. In order to access a network, IoT devices can connect through a gateway or another edge device.

However, providing effective security solutions for IoT devices can be costly in time and effort in an enterprise environment. Edge devices can be in communication with multiple IoT devices. An edge device can require code or instructions that enable communication with the various IoT devices. Different IoT devices can involve a variety of different functionalities and can utilize different communication protocols. It can be difficult to reliably provision instructions for edge devices to communicate with the range of IoT devices. Setting up test systems or manually creating instructions to enable proper communications can cause inefficiencies in time and resources that are frustrating for technicians, administrators, and end users.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to generating an Internet-of-Things (IoT) system topology. An edge device can require code or instructions that enable communication with the various IoT devices. Different IoT devices can involve a variety of different functionalities and can utilize different communication protocols. It can be difficult to reliably provision instructions for edge devices to communicate with the range of IoT devices. Previous methods of manually developing instructions to enable proper communications in an IoT system can be wasteful in time and resources. However, the present disclosure describes systems and methods that can facilitate edge device provisioning by an efficient user interface that is quickly recognizable and usable with a minimum of programming knowledge.

In some embodiments, a process can generate a user interface to include a graphical representation of a number of components. The components can be user-selected. The components can include a gateway device component, a bus component, an Internet-of-Things (IoT) device component, and other components. A relationship between the plurality of components can be determined based on user-defined connections. The user-defined connections can be identified between individual components. IoT topology code can be generated. The IoT topology code can include the relationship between the components, and properties for individual components. In some examples, the IoT topology code can be generated in a data serialization format. The IoT topology code can be converted to executable gateway instructions. The gateway instructions can include a package that enables a gateway device to communicate with an IoT device. The gateway instructions can be transmitted to the gateway device for execution.

The package can include manufacturer-defined code for communications with the IoT device. The components can include a filter component. The filter component can specify a metric to collect from the IoT device. The metric can include an aggregation size, an interval, and a unit.

A user selection of a particular component can be identified. A user interface element can be generated to include a property of the particular component. A user modification of the property can be obtained through the user interface element. The IoT topology code can be updated based the user modification.

In some cases, the user interface can include a first section and a second section. The first section of the user interface can include the graphical representation of the plurality of components, and the second section of the user interface can include the IoT topology code. In other examples, a first section of the user interface can include the graphical representation of the plurality of components, and a second section of the user interface can include a list of pre-defined components.

Figure 1:
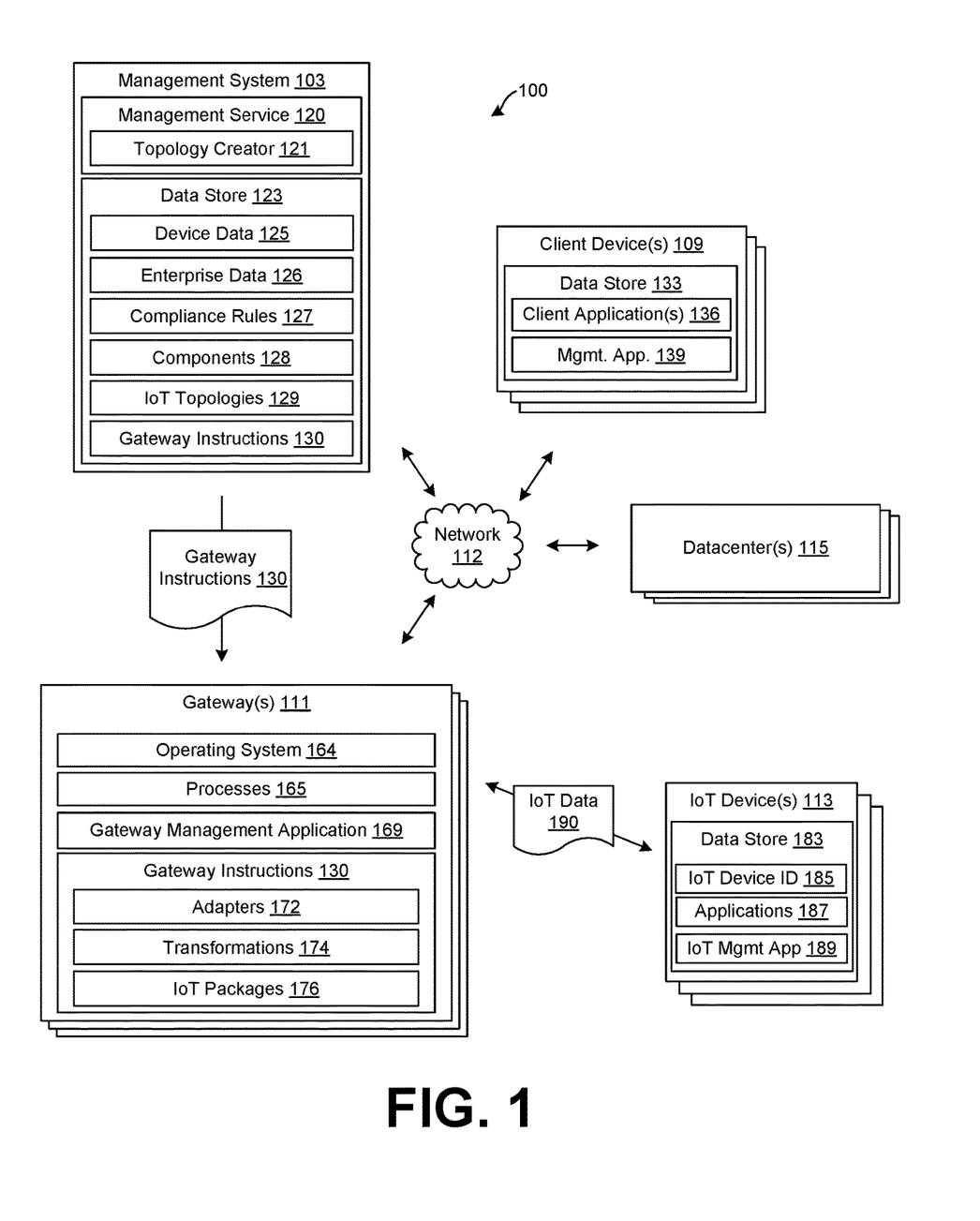
FIG. 1 is a drawing of an example of a networked environment for generating an Internet-of-Things system topology.

With reference to FIG. 1, shown is an example of a networked environment 100. The networked environment 100 can include a management system 103, a client device 109, a gateway 111, Internet-of-Things (IoT) devices 113, and datacenters 115 in communication with one another over a network 112. Internet-of-Things (IoT) devices 113 and other devices can connect to the network 112 through the gateway 111. The gateway 111 can communicate with the management service 120 for management of the IoT devices 113 that connect to the network 112 through the gateway 111. The components of the networked environment 100 can be utilized to generate an IoT system topology and provision the gateway 111 with executable instructions.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. In some embodiments, the management system can be part of a local network, and can be local to at least one of the other components of the networked environment. In other embodiments, the management system 103 can be remote from the other components, or the computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 106 can be employed in the various arrangements as described above. The components executed on the management system 103 can include a management service 120 as well as other applications, services, processes, systems, engines, or functionality not discussed in detail herein. The management service 120 can be stored in the data store 123 of the management system 103.

The management service 120 can include a topology creator 121. The topology creator 121 can include executable instructions, programs, or processes of the management service 120. Alternatively, the topology creator 121 can include instructions, programs, or processes separate from the management service 120. The topology creator 121 can include functions related to defining and customizing components 128, generating of IoT topologies 129, and converting IoT topologies 129 into gateway instructions 130. The topology creator 121 can include an interactive user interface as a tool. This can increase efficiency of using the management system 103 and the client device 109, for example, to create topologies, generate gateway instructions 130, and provision gateways 111. The user interface can be accessed through a client application 136, client management application 139, or another application of a client device 109, or can be accessed through a network site or web application.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory.

The data store 123 can include memory of the management system 103, mass storage resources of the management system 103, or any other storage resources on which data can be stored by the management system 103. The data stored in the data store 123 can include, for example, management data including device data 125, enterprise data 126, compliance rules 127, components 128, IoT topologies 129, gateway instructions 130, as well as other data.

The data stored in the data store 123 can be associated with the operation of the various applications and/or functional entities described. Client devices 109, gateways 111, and IoT devices 113 can be identified within the device data 125 by one or more of a device identifier, a unique device identifier (UDID), a media access control (MAC) address, an internet protocol (IP) address, or another identifier that uniquely identifies a device with respect to other devices.

The device data 125 can include gateway data associated with gateways 111 and other edge systems or edge devices through which IoT devices 113 can connect to the network 112. The gateway data can also include specifications, and for each gateway 111, a type of gateway or a gateway identifier 156, and other information. Specifications for the gateway 111 can include hardware configurations including a chipset utilized by the gateway, a performance or capacity, a model identifier, and software configurations, including an agent application installed on the gateway 111. For example, the configuration can identify an agent such as the gateway enrollment agent 118, the gateway management application 169, or a version of the gateway enrollment agent 118 or the gateway management application 169. The gateway data can also include an organizational group.

Device data 125 can include data associated with a configuration of each client device 109, gateway 111, and IoT device 113 and can include an identifier of the client device 109, gateway 111, or IoT device 113. The identifier can be a serial number, media access control (MAC) address, other network address, or another device identifier. In addition, the device data 125 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data 126, while a client device 109, gateway 111, or IoT device 113 designated as "not enrolled," or having no designation, can be denied access to the enterprise data 126.

Additionally, device data 125 can include indications of the state of devices including the client devices 109, gateways 111, and IoT devices 113. For instance, these indications can specify applications that are installed on the client devices 109, gateways 111, and IoT devices 113; configurations or settings that are applied to each of the devices, user accounts, gateway accounts, or service accounts associated with each of the devices; the physical locations of each of the devices; the network to which each of the devices is connected; and other information describing the current state of each of the devices.

Device data 125 can also include data pertaining to user groups. An administrator can specify one or more of the client devices 109, gateways 111, and IoT devices 113 as belonging to a user group. The user group can refer to a group of user accounts, which can include gateway accounts. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department. Device data 125 associated with a gateway account can be referred to as gateway data.

Compliance rules 127 can include, for example, configurable criteria that must be satisfied for an enrolled one of the client devices 109, gateways 111, and IoT devices 113 to be in compliance with the management service 120. The compliance rules 127 can be based on a number of factors, including geographical location, activation status, enrollment status, and authentication data including authentication data obtained by a device registration system, time, and date, and network properties, among other factors associated with each device. The compliance rules can also be determined based on a user account associated with a user. In some cases, a gateway 111 can be unassociated with a user, but can nevertheless be associated with a service account, a gateway account, or another user account that is unassociated with a user.

Compliance rules 127 can include predefined constraints that must be met in order for the management service 120, or other applications, to permit access to the enterprise data 126 or features of the gateway 111. The management service 120 can communicate with gateway management application 169 such as a gateway enrollment agent 118, gateway management application 169, or other applications to determine whether states exist on the client device 109, gateway 111, or IoT devices 113 that do not satisfy one or more compliance rules 127. States can include, for example, a virus or malware being detected on the device; installation or execution of a blacklisted application; and a device being "rooted" or "jailbroken," where root access is provided to a user of the device. Additional states can include the presence of particular files, questionable device configurations, vulnerable versions of applications, vulnerable states of IoT devices 113, or other vulnerability, as can be appreciated.

The components 128 can include devices and device subcomponents, program modules, and functionalities. The components 128 can include any physical or logical elements that affect the operation of the gateway 111. Components 128 can include physical devices such as gateways 111, IoT devices 113, and datacenters 115, as well as busses, transformations, northbound communications components, and other components. The components 128 can include specifications that can determine an IoT topology 129 of the data flow from an IoT device 113, through the gateway 111, to a northbound destination. In some cases, busses can be southbound communications components. A bus or southbound communications component can define the communications mechanisms between an IoT device 113 and the gateway 111. A northbound communications component can define communications mechanisms between the gateway 111 and a datacenter 115, a management service 120, a client device 109, or another network destination. The northbound communications component can also be referred to as a datacenter communications component. A transformation 174 can include a metric to collect from a time-series stream of IoT data 190 from an IoT device 113 to a datacenter 115.

An IoT topology 129 can include code that describes a relationship between components 128. The relationship can be a hierarchical relationship, an asymmetrical relationship, a symmetrical relationship, or another ordered relationship. The IoT creator 121 can provide an interactive user interface that allows a user to define connections between components 128. The relationship can be determined from the user-defined connections between components 128, and the IoT topology 129 can be generated using the user-defined connections. A relationship can define multiple connections or links between components 128 that are linked or connected. A component 128 can be linked to more than one of the other components 128. In some cases, the IoT topology 129 is utilized in order to provision a gateway 111 or another edge device. The IoT topology 129 can include or code or lines expressed in a data serialization format such as JavaScript Object Notation (JSON), eXtensible Markup Language (XML), or YAML.

Gateway instructions 130 can include executable code for a particular gateway 111 or type of gateway to communicate with a particular set of IoT devices 113. The gateway instructions 130 can be generated based on the IoT topology 129. The topology creator 121 can parse the IoT topology 129 and can convert it into the gateway instructions 130. The conversion can differ based on the operating system 164 and other processes 165 executing on a particular gateway 111.

For example, the topology creator 121 can convert the IoT topology 129 code into Python or Python-based executable code, C or C-based executable code, or executable code in other programming languages. To this end, the topology creator 121 can generate the gateway instructions 130 using various sets of executable code fragments and rules for the various programming languages. The executable code fragments and rules can be stored in the data store 123. The topology creator 121 can identify a programming language based on an identity of a particular gateway 111 or a software version of the gateway 111 referenced in the IoT topology 129. The topology creator 121 can convert the IoT topology 129 to executable gateway instructions 130 by referencing the language-specific code fragments and translation rules for the programming language.

In addition, the topology creator 121 can utilize manufacturer-defined code fragments that enable communications with a particular IoT device 113. The manufacturer code fragments can include portions in a particular messaging protocol for the IoT device 113. Messaging protocols can include Message Queuing Telemetry Transport (MQTT), Constrained Application Protocol (CoAP), Simple Text Oriented Messaging Protocol (STOMP), Extensible Messaging and Presence Protocol (XMPP), Advanced Message Queuing Protocol (AMQP), Web Socket, and Representational State Transfer (REST). The topology creator 121 can integrate the manufacturer code fragments into a package, which can include code that enables the particular gateway 111 to communicate with the particular IoT device 113.

The management service 120 can oversee the management of devices including the client devices 109, gateways 111, and IoT devices 113. The management service 120 can oversee development of IoT system topologies and gateway instructions for the gateways 111 and the IoT devices 113. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein. The management service 120 can generate and provide an administrative console or user interface for management of the gateway 111, other edge devices, and IoT devices 113 that are connected through the edge devices. The user interface of the management service 120 can be accessed through a client application 136, client management application 139 or another application of a client device 109, or can be accessed through a network site provided by the management service 120. The user interface can also be accessed through a web application provided by the management service 120. The user interface can include the IoT topology creator 121. The management service 120 can provide particular users or user accounts with access to the topology creator 121, the components 128, the IoT topologies 129, and the gateway instructions 130, based on authentication credentials and confirmation that a client device 109 complies with the compliance rules 127.

The management service 120 can include a message broker for onboarding and configuration of gateway devices 111 and other edge devices, as well as IoT devices 113. The message broker can utilize Message Queuing Telemetry Transport (MQTT) or another publish-subscribe-based messaging protocol, Advanced Message Queuing Protocol (AMQP), or another messaging protocol. The management service 120 can also include an analytics service that provides real-time infrastructure analytics for the gateway 111, other edge devices, and IoT devices 113. The analytics can be generated based on IoT data 190 provided from the gateway 111 or other edge devices.

The IoT data 190 can include a stream of at least one tuple including a number and a time stamp. The IoT data 190 can include SI units and a prefix that identifies what the numbers of the stream of IoT data 190 represent. A user interface can be generated based at least in part on the IoT data 190. The gateway 111 can provide IoT data 190 to the management service 120 based on IoT device 113 communications with the gateway 111.

The management service 120 can also request that the gateway 111, client device 109, or IoT device 113 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the gateway 111 check-in with the management service 120. The notification service can push or otherwise route a notification to the gateway 111. Once the notification is received, the gateway management application 169 can cause the gateway 111 to check-in with the management service 120. The gateway management application 169 can determine whether a command queue provided by the management service 120 for the respective gateway 111 contains any commands or resources for the gateway 111, and, if so, can cause the commands or resources to be downloaded and/or implemented on the gateway 111. A client device 109 can likewise be associated with a command queue and can retrieve and implement commands in response to a request from a notification service.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 145 that also includes applications 136, a client management application 139, and other data. The client device 109 can execute the client management application 139 or client application 136 to access the functionality described for the management service 120. For example, the client device 109 can authenticate with the management service 120 to access the topology creator 121, and its user interface can be rendered for display on the client device 109.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 136, such as a client management application 139, a browser application, or another application. The operating system and some applications 136 can access network content served up by the management system 103, or other servers, thereby rendering a user interface on a display, such as a liquid crystal display (LCD), organic light emitting diode (OLED) display, touch-screen display, or other type of display device.

To this end, some applications 136 can include a browser or a dedicated application, and a user interface can include a network page, an application screen, or other interface. The client device 109 can also access web applications using the browser application. Further, other applications 136 can include device management applications, enterprise applications, social networking applications, word processors, spreadsheet applications, media player applications, or other applications. The client management application 139 can be an application that performs certain functions in the enrollment of the gateway 111 with the management service 120. The client management application 139 can perform actions as directed by the management service 120, for instance, by checking in with the management service 120, retrieving a command from the command queue, and implementing the command as discussed above.

The gateway 111 can provide network 112 access to the IoT devices 113 as well as gather IoT data 190 based on IoT device 113 communications with the gateway 111. While referred to as a gateway, the gateway 111 can also be representative of routing switches, integrated access devices (IADs), multiplexers, a variety of metropolitan area network (MAN) and wide area network (WAN) access devices, and other edge devices.

The gateway management application 169 can perform management functionalities including enrollment functionalities, product and application installations, and profile installations. These functionalities can include a number of modules or components that perform actions through the gateway 111, and the gateway management instructions can be updated, upgraded, or otherwise altered throughout the lifecycle of the gateway 111. The gateway management application 169 can include a number of components including an IoT Agent for management and communication with IoT devices 113. The IoT Agent can include a software development kit (SDK) for gateway 111 communications with IoT devices 113. The SDK can include libraries for applications including processes 165 that connect and orchestrate data and control between IoT devices 113, gateways 111, and other network locations. The gateway instructions 130 can be generated to include executable instructions that are compatible with the IoT Agent, or compatible with a programming language of the IoT Agent. To this end, in some cases, the gateway instructions 130 include executable instructions in the same programming language. The gateway management application 169 can perform the functionalities for the management service 120, for instance, by checking in, retrieving a command from the command queue, and implementing the command as discussed above.

The gateway instructions 130 can be instructions received from the management service 120 for communications with northbound destinations such as a datacenter 115, as well as southbound destinations such as the IoT devices 113. The gateway instructions 130 can include adapters 172, transformations 174, and IoT packages 176. The adapters 172 can include instructions that enable the gateway 111 to communicate with northbound destinations. The northbound destinations can include datacenters 115, management services 120, client devices 109, or other network locations to which the gateway 111 transmits IoT data 190, or a transformed version of IoT data 190. The IoT packages 176 can include instructions that enable the gateway 111 to communicate with southbound destinations, including IoT devices 113. The IoT packages 176 can include the manufacturer-defined code fragments for communications with a particular IoT device 113, as well as additional code for compatibility with the processes 165 and hardware of the gateway 111.

The transformations 174 can include filters, triggers, and other transformations of the IoT data 190. For example, the transformations 174 can indicate which IoT data 190 to store in the gateway 111 and which IoT data 190 to transmit to northbound destinations. The transformations 174 can include a metric to collect from the IoT device 113. The metric or transformation 174 can include a user defined method (udm), a name, title, or other identifier of the metric, a sampling frequency stating the interval between subsequent executions of the udm, an aggregation size indicating a number of bytes or other data size, and an aggregation count indicating how many executions of the udm to aggregate before sending the IoT data 190, to the management service 120, the datacenter 115, or a client device 109.

The IoT devices 113 can be appliances, vehicles, sensors, controllers, actuators, and other physical devices including at least: a processor, network communication hardware, and a memory including executable instructions for communicating with a gateway 111. The IoT device 113 can be representative of one or more IoT devices 113. The IoT device 113 can include appliances, vehicles, sensors, controllers, actuators, monitors, phones, tablets, thermostats, speakers, and other devices and can incorporate processor-based systems, such as a computer system or any other device with like capability. The IoT device 113 can have an operating system or other software that can perform functionalities and execute applications 187. The operating system can be stored in a data store 183 that also includes IoT Device ID 185, applications 187, an IoT management application 189, and other data. The IoT device 113 can execute the IoT management application 189 to perform or access the functionality described for the management service 120. The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable.

The IoT management application 189 can perform actions as directed by the management service 120 and/or the gateway 111. The gateway management application 169 and/or the management service 120 can maintain a command queue for the IoT device 113. The command queue for the IoT device 113 can include actions and commands as discussed. The gateway management application 169 can determine whether states exist on the IoT device 113 that violate one or more of the compliance rules 127 based on status data received from the IoT device 113, or pass status data received from the IoT device 113 to the management service 120 to perform the evaluation. If the IoT device 113 is not in compliance, the gateway management application 169 or the management service 120 can place a command to bring the IoT device 113 into compliance in a command queue for the IoT device 113. The IoT management application 189 can retrieve the command to bring the IoT device 113 into compliance. The IoT management application 189 can implement the command. The management service 120 can place a command for the IoT device 113 in the command queue for the gateway 111. The gateway management application 169 can retrieve the command and place it in a command queue for the IoT device 113 that is maintained on the gateway 111.

Figure 2:
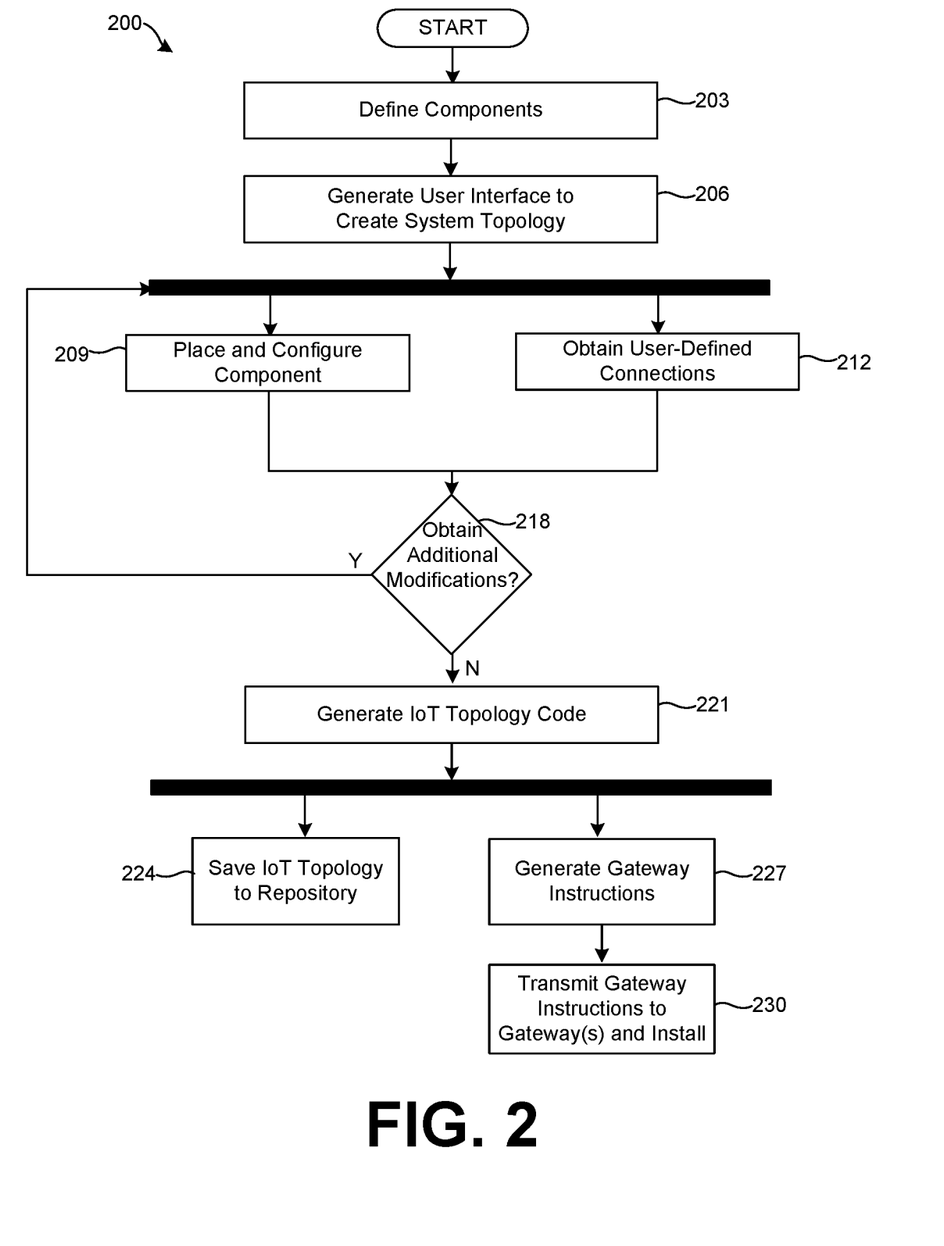
FIG. 2 is an example flow chart illustrating functionality implemented by components of the networked environment.

In FIG. 2, shown is an example flowchart 200 describing steps that can be performed by the management service 120. Generally, the flowchart 200 describes how the management service 120 and the topology creator 121 generate an IoT topology 129 and gateway instructions 130 for communications between a gateway 111 and IoT devices 113. The operations of the gateway 111 can include receiving IoT data 190 from a set of IoT devices 113, transforming the IoT data 190, and transmitting specified metrics to datacenters 115 or management services 120. The topology creator 121 can identify specifications for the physical and logical components 128 that affect this process and generate the IoT topology 129 and the gateway instructions 130 based on the components 128 and their specific arrangement.

In step 203, the topology creator 121 can define components 128 for an IoT topology 129. The components 128 can be stored in the data store 123. The components 128 can include physical devices such as gateways 111, IoT devices 113, and datacenters 115. The components 128 can also include device subcomponents for the devices, software modules or processes for the devices, as well as transformations 174 for the gateway 111 to perform, including metrics to collect from IoT data 190. The components 128 can include any physical or logical items that affect the operation of the gateway 111.

The components 128 can also include busses of the gateway 111, such as I2C busses, MQTT busses, Web Socet busses, REST busses, CoAP busses, and busses associated with any messaging protocol discussed. The gateway 111 can communicate with a particular IoT device 113 through a particular bus. The components 128 can also include transformations 174. The transformations 174 can include filters, triggers, and other transformations of the IoT data 190. For example, the transformations 174 can include a metric to collect based on the IoT data 190 from the IoT device 113. The metric can include a name, title, or other identifier of the metric, a user defined method (udm), a sampling frequency stating the interval between subsequent executions of the udm, and an aggregation count stating how many executions of the udm to aggregate by the gateway 111. The components 128 can also include northbound communications components. The gateway 111 can communicate with a particular northbound destination using a northbound communications component or mechanism.

In step 206, the topology creator 121 can generate a user interface that facilitates creation of an IoT topology 129. The user interface of the topology creator 121 can be an interactive tool that allows a user to efficiently define components 128 that are utilized for a data flow from an IoT device 113, through a gateway 111, and to a northbound destination such as a datacenter 115 or management service 120. The user interface of the topology creator 121 can facilitate creation, storage, and editing of a number of IoT topologies 129. The user interface can include a listing of categories of components 128. The user interface can also include a number of predefined components 128 and blank components 128 for each category. The components 128 can include attributes or parameters that are editable or configurable. The components 128 can also include or be associated with static or unconfigurable parameters and information.

In step 209, the topology creator 121 can allow a user to place and configure components 128 through the user interface. A user can look through the categories of components 128 and select a component. Once selected, a graphical representation of the component 128 can appear in an area of the user interface such as a coordinate plane or grid. A user can move the position of the component 128 in the coordinate plane of the user interface. The topology creator 121 can also provide a user interface element that shows the parameters of the component 128. A user can edit the parameters of the component 128 through the user interface. Multiple components 128 can be placed and configured.

In step 212, the topology creator 121 can allow a user to obtain user-defined connections through the user interface. The graphical representations of the components 128 in the coordinate plane of the user interface can include connection points. A user can select a connection point of a first component 128 and then select a connection point of a second component 128 to define a connection between the first and second components 128. A single connection point of a component 128 can be connected to more than one connection point of more than one other components 128. For example, a single bus component 128 can be connected to multiple IoT device components 128. A single gateway component 128 can be connected to multiple bus components 128. The topology creator 121 can track and store the component relationships. The topology creator 121 can track the components 128 and all of the connections.

In step 218, the topology creator 121 can obtain additional modifications. If additional modifications are performed, the process can move to step 209 or step 212. If no additional modifications are performed, the process can move to step 221.

In step 221, the topology creator 121 can generate IoT topology 129. The IoT topology 129 can create the IoT topology 129 that specifies attributes or parameters of the components 128, as well as the component relationship. An IoT topology 129 can include code that describes the relationship between the components 128. The IoT topology 129 can include or code or lines expressed in a data serialization format such as JSON, XML, or YAML. The IoT topology 129 can specify the relationships between components 128, where appropriate. The relationships can be derived from the arrangement of components 128 in the coordinate plane and the user-defined connections.

In step 224, the topology creator 121 can save the IoT topology 129 to a repository. The repository can be the data store 123 of the management service 120. In other cases, the repository can be hosted in another network location. The IoT topology 129 can be stored in association with a category or type of IoT system for a particular purpose. In this way, the IoT topology 129 can be utilized for multiple instances of the type of IoT system and in multiple locations. The IoT topology 129 can also be quickly edited, for example, to change a type of gateway 111 used or the number of IoT devices 113 employed. The topology creator 121 can include a panel that allows a user to select a completed IoT topology 129 for further modification.

In step 227, the topology creator 121 can generate gateway instructions 130. The gateway instructions 130 can be generated based on the IoT topology code 129. The topology creator 121 can parse the IoT topology 129 and can convert it into the gateway instructions 130. The conversion can be performed based on the operating system 164 and other processes 165 executing on a particular gateway 111, as specified in the IoT topology 129. For example, the topology creator 121 can convert the IoT topology 129 code into executable code in a particular programming language. To this end, the topology creator 121 can generate the gateway instructions 130 using a set of executable code fragments and rules for the particular language. The executable code fragments and rules can be stored in the data store 123. The topology creator 121 can identify the programming language based on an identity of a particular gateway 111 or a software version of the gateway 111 referenced in the IoT topology 129. The topology creator 121 can convert the IoT topology 129 to executable gateway instructions 130 by referencing the language-specific code fragments and translation rules for the programming language.

The gateway instructions 130 can include adapters 172, transformations 174, and IoT packages 176. The adapters 172 can include instructions that enable the gateway 111 to communicate with northbound destinations specified in the IoT topology 129. The IoT packages 176 can include instructions that enable the gateway 111 to communicate with southbound IoT devices 113. The IoT packages 176 can include the manufacturer-defined code fragments for communications with a particular IoT device 113, as well as additional code for compatibility with the processes 165 and hardware of the gateway 111.

The transformations 174 can include filters, triggers, and other transformation specified in the IoT topology 129. The transformations 174 can include a metric to collect from the IoT device 113. The metric or transformation 174 can include a user defined method (udm), a name, a sampling frequency, and an aggregation count stating how many executions of the udm to aggregate before transmitting the IoT data 190, to the northbound destinations specified in the IoT topology 129.

In step 230, the topology creator 121, or the management service 120, can transmit gateway instructions 130 to gateway(s) 111. In some cases, the topology creator 121, or the management service 120, can transmit the gateway instructions 130 along with a command to install the gateway instructions 130 to a gateway 130, or a set of gateways 130 that are to be provisioned according to the IoT topology 129. The management service 120 can create a title, tag, or group for gateways 111 to be provisioned with the gateway instructions 130. The gateway management application 169 can receive the command to install the gateway instructions 130 and perform the installation to the gateway 111.

Figure 3A:
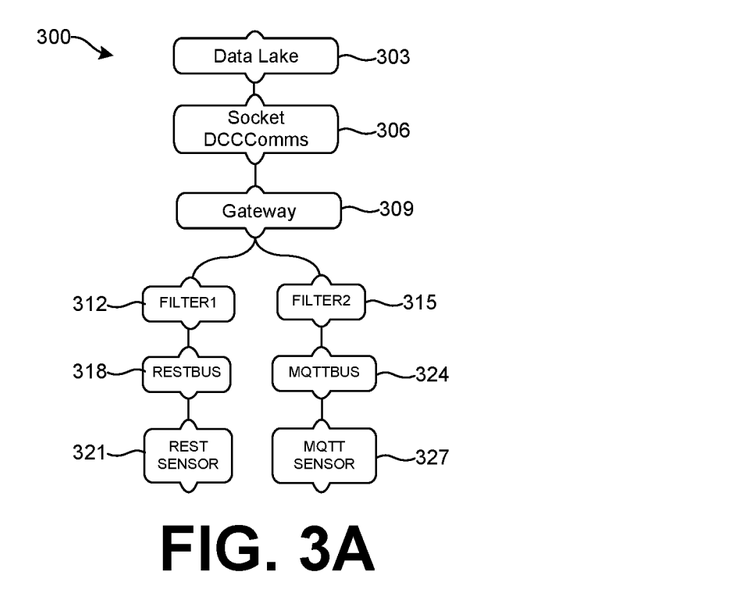
FIGS. 3A-3B are drawings illustrating graphical representations of IoT topologies.

FIG. 3A shows a graphical representation of an IoT topology 300. The graphical representation of the IoT topology 300 can be generated in a user interface of the topology creator 121. The IoT topology 300 can include a data lake component 303, a socket DCCComms component 306, a gateway component 309, a filter1 component 312, a REST bus component 315, a REST sensor component 318, a filter2 component 321, an MQQT bus component 324, and an MQTT sensor 327. A user can select, place, and configure each of the components of the IoT topology 300.

Generally, a respective component can specify a unique component identifier that is unique among all of the components of the IoT topology 300. The IoT topology creator 121 or the management service 120 can generate the unique component identifier. The respective component can specify a name that is more user friendly, easily recognizable, and can be displayed in association with the respective component within the user interface of the IoT topology creator 121. The respective component can specify a component location within a coordinate plane. The respective component can also specify a component category that indicates a type of the component. The component location can include an X position and Y position. The components can also include other parameters, for example, as indicated below.

The data lake component 303 can be a northbound destination for specifying metrics collected, by the gateway component 309, from the REST sensor component 321 and the MQTT sensor component 327. The REST sensor component 321 and the MQTT sensor component 327 can be IoT device components. In addition to those discussed above for all components, the data lake component 303 can specify parameters including a network address such as an IP address or URL. When selected through a user interface of the topology creator 121, these properties can be edited through a user interface element of the topology creator 121. The data lake component 303 can be connected to the Socket DCCComms component 306. In order to create the connection between these components, a user can select a connection point on the bottom of the data lake component 303 and subsequently select the top connection point of the Socket DCCComms component 306.

The Socket DCCComms component 306 can be a northbound communications component. The Socket DCCComms component 306 can specify parameters including a network address and a port. The Socket DCCComms component 306 can be connected to the gateway component 309. The IoT topology 300 indicates that the gateway component 309 can be connected to the data lake component 303 through the SocketDCCComms component 306. The gateway component 309 can be connected to the filter1 component 312 and the filter2 component 315.

The filter1 component 312 can be a transformation 174 component. The filter1 component 312 can specify parameters including an endpoint or northbound destination, as well as parameters of a metric to collect, including a unit or type of data, an aggregation size, an aggregation count, and an interval or frequency of collection. The aggregation size can include a number of bytes or data size. The interval can indicate a frequency of collection of a particular metric. The aggregation count can indicate a number of times the metric should be collected before transmitting to the endpoint. In some cases, the endpoint can be a particular subsection of the northbound destination such as a temperature collection endpoint of the data lake component 303. The filter2 component 315 can include similar parameters as the filter1 component 312. The filter1 component 312 can be connected to the REST bus component 318.

The REST bus component 318 can be a southbound communications component. The REST bus component 318 can specify parameters including a network address. The REST bus component 318 can be connected to the REST sensor component 321. The REST sensor component 321 can specify parameters, including a type of IoT device, and a make/model of the IoT device. The REST sensor component 321 can also specify or point to the manufacturer-defined code that enables communications with the REST sensor component 321. In some cases, the REST sensor component 321 and other IoT device components can specify the parameters associated with the metric that is collected, as discussed above regarding the transformation component, filter1.

Figure 3B:
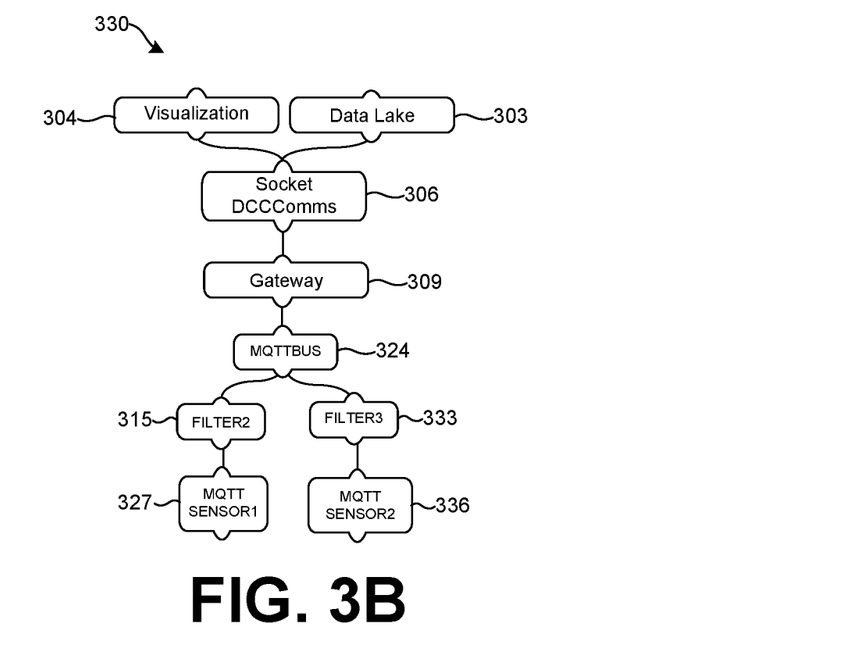

FIG. 3B shows a graphical representation of an IoT topology 330. The graphical representation of the IoT topology 330 can be similar in some respects to the IoT topology 300 discussed regarding FIG. 3A. The IoT topology 330 can indicate that the Socket DCCComms component 306 is connected to both the data lake component 303 and the visualization component 303. The visualization component 304 can indicate that some of the metrics collected are transmitted to a server that provides a visualization dashboard such as Graphite, or another visualization user interface. The filter or transformation components can specify whether a particular metric should be transmitted to the data lake component 303, the visualization component 304, or both northbound destinations of the IoT topology 330.

The IoT topology 330 can indicate that the MQTT bus component 324 is connected to multiple filters or transformations. In this case, the MQTT bus component 324 is connected to the filter2 component 315 and a filter3 component 333. The filter3 component 333 can indicate parameters that are similar to those discussed regarding the filter1 component 312. The IoT topology 330 also illustrates that the transformation components such as the components 315 and 333 can be connected between a southbound communications component and an IoT device component, rather than between an edge device component and a southbound communications component.

Figure 4:
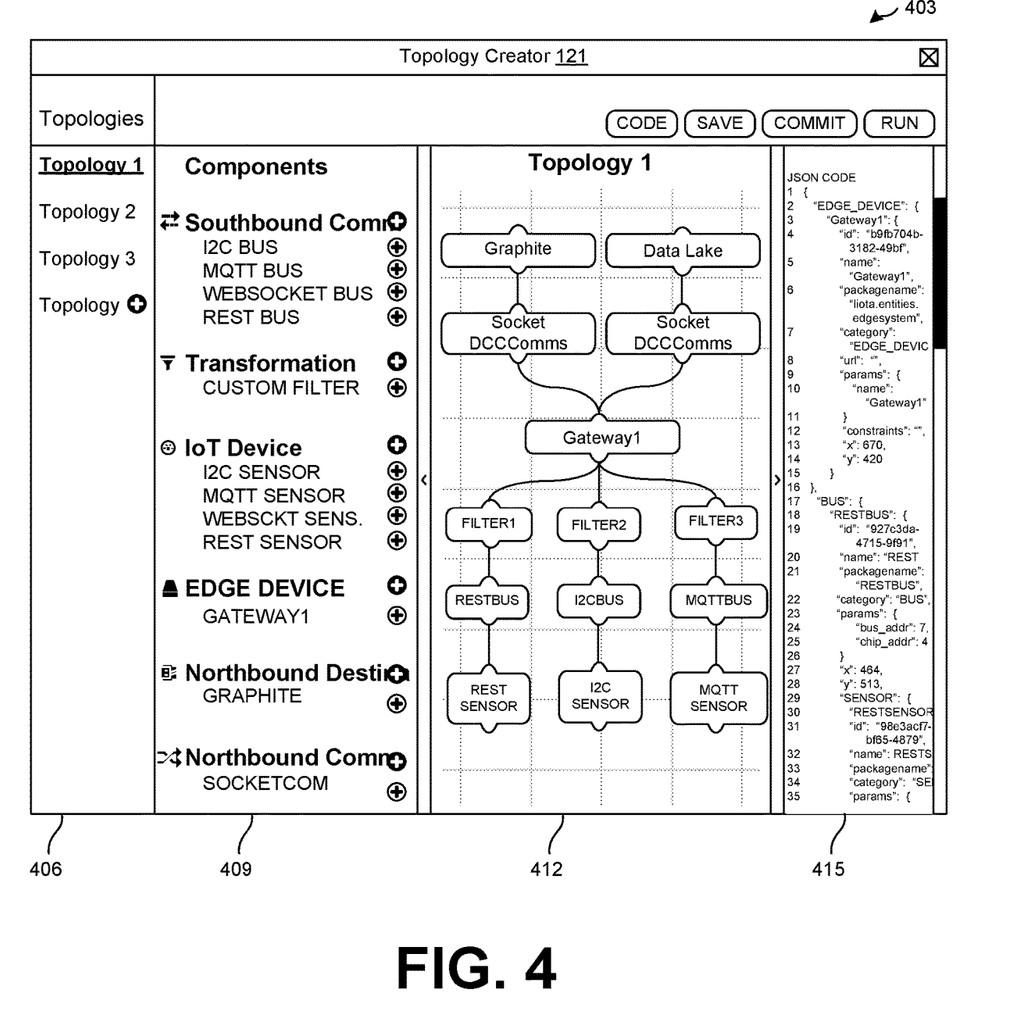
FIGS. 4-6 are drawings illustrating functionality implemented by components of the networked environment and rendered for display.

FIG. 4 shows an example of a user interface 403 generated by the topology creator 121 and rendered for display. The user interface 403 can include a panel or section 406 that includes a list of IoT topologies 129. Multiple IoT topologies 129 can be shown for selection. For example, the panel 406 can show "Topology 1," "Topology 2," and "Topology 3," each of which can be an automatically assigned profile identifier, or a user-assigned profile identifier. The panel 406 can also include a user interface element that, when selected, causes an additional profile to be created.

The user interface 403 can also include a panel or section 409. The panel 409 can also include a list of components 128, arranged in various categories or types. Multiple categories of components 128 can be shown. For example, the panel 409 can show categories including "Bus," "Transformation," "IoT Device," "Edge Device," "Northbound Destination," and "Northbound Comm." A respective category can have predefined components listed in association with the category. For example, "Southbound Comms" can include an "I2C Bus," "MQTT Bus," "Web Socket Bus," and REST Bus."

The user interface 403 can also include a panel or section 412. The panel 412 can include a coordinate plane, where a user can build or create a graphical representation of an IoT topology 129. The user interface 403 can also include a code panel or section 415. The panel 412 can include the IoT topology 129 code that can be generated based on the components and connections indicated in the coordinate plane of the panel 412. The IoT topology 129 code can be edited directly through the panel 415. The topology creator 121 can identify changes to the IoT topology 129 code in the panel 415 and automatically update the graphical representation of the IoT topology 129 in the panel 412. In addition, the topology creator 121 can identify user modifications to the graphical representation of the IoT topology 129 and automatically update the IoT topology 129 code in the panel 415.

The user interface 403 can also include a number of user interface elements that, when selected, provide various additional functionalities. The user interface 403 can also include a "code" user interface element that when selected causes the IoT topology 129 to show or hide the code panel 415. The user interface 403 can also include a "save" user interface element that when selected causes the IoT topology 129 to saved, for example, to the management system 103 or a client device 109. The user interface 403 can also include a "commit" user interface element that, when selected, causes the IoT topology 129 to uploaded to a particular repository based on a predefined network location or address.

The user interface 403 can also include a "run" user interface element that, when selected, causes the IoT topology 129 to generate gateway instructions 130 based on the IoT topology 129, and run it on an IoT system that include a gateway 111 and an IoT device 113, which correspond to the components specified in the IoT topology 129. In some cases, the user interface 403 can also include a "generate gateway instructions" user interface element that, when selected, causes the IoT topology 129 to generate gateway instructions 130 based on the IoT topology 129.

Figure 5:
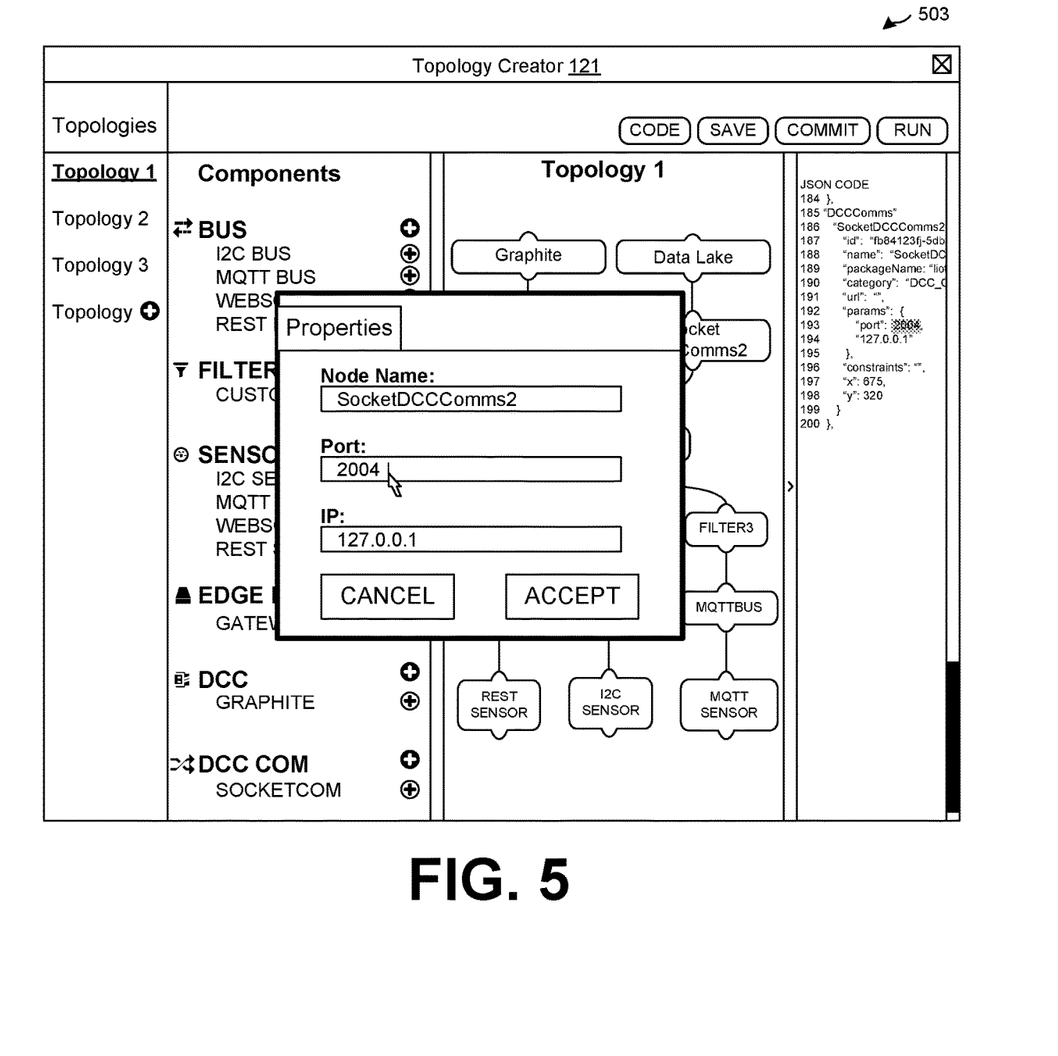

FIG. 5 shows an example of a user interface 503 generated by the topology creator 121 and rendered for display. The topology creator 121 can generate a "properties" user interface area 506 in response to a user selection of a particular component in the coordinate plane of the user interface 503. The properties user interface element 506 can be generated a pop-up area or section as shown, or in an additional panel. The properties user interface area 506 can show various parameters of the selected component. The properties user interface area 506 can provide a user interface element for a respective parameter that when selected, allows a user to modify the respective parameter. Once modified, the topology creator 121 can update the graphical representation of the IoT topology 129 and the IoT topology 129 code.

Figure 6:
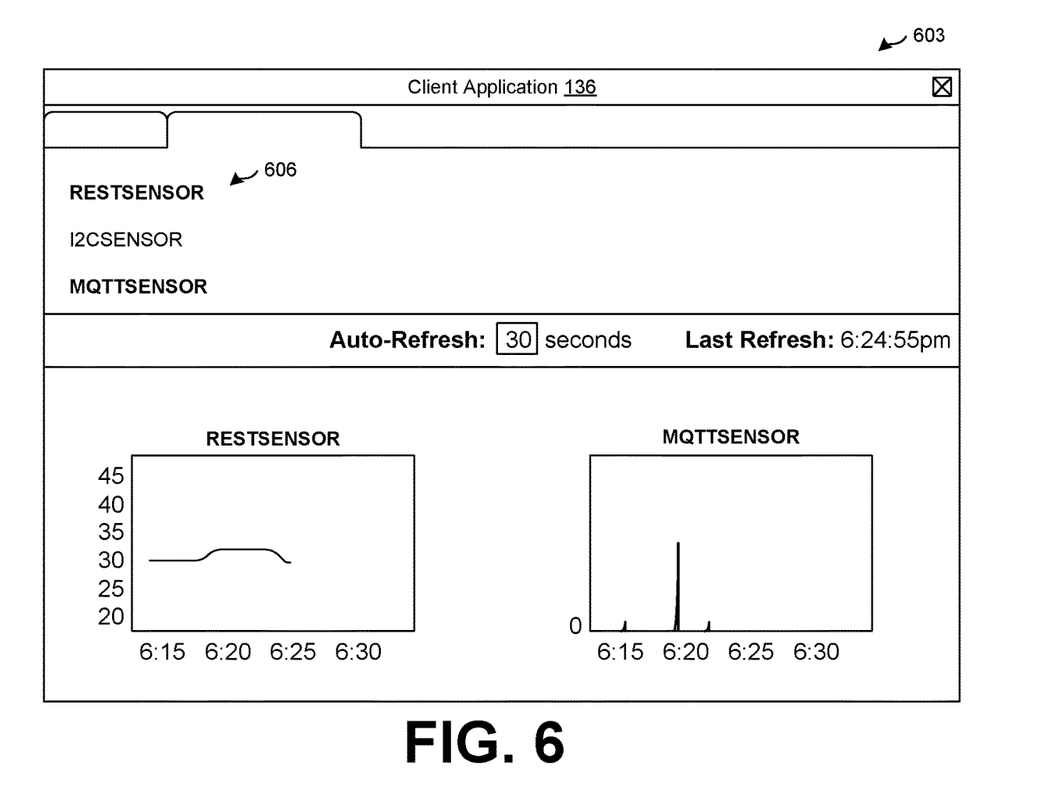

FIG. 6 shows an example of a user interface 603 generated by a client application 136 or a datacenter 115 and rendered for display. The user interface 603 can include a list of IoT devices 606, including "RESTSENSOR," "I2CSENSOR," and "MQTTSENSOR." The "RESTSENSOR" and "MQTTSENSOR" devices can be shown in bold, indicating that a metric received a corresponding IoT device 113 is selected for display. The user interface 603 can also include graphs 609 and 612. The graphs 609 and 612 can show IoT data 190 based on the collected metrics from the IoT devices 113. In some cases, the graphs can show a value plotted across time, where the value can be indicated in an X dimension of the graph, and time is indicated in a Y dimension of the graph. The user interface 603 can include a user interface element that allows a user to enter an auto-refresh rate. The auto-refresh rate can indicate how often the user interface 603 should be updated based on additional data received from an IoT device 113 through a gateway 111. The user interface 603 can indicate a most recent time that the user interface 603 was refreshed.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by a client application 136, management service 120, IoT creator 121, or another application can be rendered. In some examples, the user interface can be generated with user interface data provided by the management system 103. The client devices 109 can also include one or more input/output devices that can include, for example, a capacitive touchscreen or other type of touch input device, fingerprint reader, or keyboard.

Although the management service 120, IoT creator 121, client applications 136, and other various services and functions described can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. In addition, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, the following is claimed:

1. A system, comprising:
a computing device; and
a data store comprising executable instructions, wherein the instructions, when executed by at least one processor, cause the computing device to at least:
generate a user interface comprising a graphical representation of a plurality of components, the plurality of components comprising: a gateway device component and an Internet-of-Things (IoT) device component;
determine a relationship between the plurality of components based on user-defined connections between individual ones of the plurality of components;
generate IoT topology code comprising: the relationship between the plurality of components, and properties for individual ones of the plurality of components;
convert the IoT topology code to executable gateway instructions, the gateway instructions comprising a package that enables a gateway device to communicate with an IoT device, the package comprising manufacturer-defined code for communicating with the IoT device, wherein the gateway device corresponds to the gateway device component, and the IoT device corresponds to the IoT device component; and
transmit the gateway instructions to the gateway device for execution by the gateway device.

2. The system of claim 1, the plurality of components further comprising: a filter component, wherein the filter component specifies a metric to collect from the IoT device, the metric comprising: an aggregation size, an interval, and a unit.

3. The system of claim 1, wherein the instructions, when executed by the at least one processor, cause the computing device to at least:
identify a user selection of a particular component;
generate a user interface element comprising a property of the particular component;
identify a user modification of the property through the user interface element; and
update the IoT topology code based the user modification of the property.

4. The system of claim 1, wherein a first section of the user interface comprises the graphical representation of the plurality of components, and a second section of the user interface comprises the IoT topology code.

5. The system of claim 1, wherein the IoT topology code is generated in a data serialization format.

6. The system of claim 1, wherein a first section of the user interface comprises the graphical representation of the plurality of components, and a second section of the user interface comprises a list of pre-defined components.

7. A method performed by a computing device, the method comprising:
generating a user interface comprising a graphical representation of a plurality of components, the plurality of components comprising: a gateway device component and an Internet-of-Things (IoT) device component;
determining a relationship between the plurality of components based on user-defined connections between individual ones of the plurality of components;
generating IoT topology code comprising: the relationship between the plurality of components, and properties for individual ones of the plurality of components;
converting the IoT topology code to executable gateway instructions, the gateway instructions comprising a package that enables a gateway device to communicate with an IoT device, the package comprising manufacturer-defined code for communicating with the IoT device, wherein the gateway device corresponds to the gateway device component, and the IoT device corresponds to the IoT device component; and
transmitting the gateway instructions to the gateway device for execution by the gateway device.

8. The method of claim 7, the plurality of components further comprising: a filter component, wherein the filter component specifies a metric to collect from the IoT device, the metric comprising: an aggregation size, an interval, and a unit.

9. The method of claim 7, further comprising:
identifying a user selection of a particular component;
generating a user interface element comprising a property of the particular component;
identifying a user modification of the property through the user interface element; and
updating the IoT topology code based the user modification of the property.

10. The method of claim 7, wherein a first section of the user interface comprises the graphical representation of the plurality of components, and a second section of the user interface comprises the IoT topology code.

11. The method of claim 7, wherein the IoT topology code is generated in a data serialization format.

12. The method of claim 7, further comprising:
transmitting the IoT topology code to a management service.

13. A non-transitory computer-readable medium embodying executable instructions, wherein the instructions, when executed by at least one processor, cause a computing device to at least:
- generate a user interface comprising a graphical representation of a plurality of components, the plurality of components comprising: a gateway device component and an Internet-of-Things (IoT) device component;
- determine a relationship between the plurality of components based on user-defined connections between individual ones of the plurality of components;
- generate IoT topology code comprising: the relationship between the plurality of components, and properties for individual ones of the plurality of components;
- convert the IoT topology code to executable gateway instructions, the gateway instructions comprising a package that enables a gateway device to communicate with an IoT device, the package comprising manufacturer-defined code for communicating with the IoT device, wherein the gateway device corresponds to the gateway device component, and the IoT device corresponds to the IoT device component; and
- transmit the gateway instructions to the gateway device for execution by the gateway device.

14. The non-transitory computer-readable medium of claim 13, the plurality of components further comprising: a filter component, wherein the filter component specifies a metric to collect from the IoT device, the metric comprising: an aggregation size, an interval, and a unit.

15. The non-transitory computer-readable medium of claim 13, wherein the instructions, when executed by the at least one processor, cause the computing device to at least:
- identify a user selection of a particular component;
- generate a user interface element comprising a property of the particular component;
- identify a user modification of the property through the user interface element; and
- update the IoT topology code based the user modification of the property.

16. The non-transitory computer-readable medium of claim 13, wherein a first section of the user interface comprises the graphical representation of the plurality of components, and a second section of the user interface comprises the IoT topology code.

17. The non-transitory computer-readable medium of claim 13, wherein the IoT topology code is generated in a data serialization format.

* * * * *